United States Patent [19]
Agusa et al.

[11] 3,748,429
[45] July 24, 1973

[54] MULTIPLE-WIRE SINGLE-PASS SUBMERGED-ARC WELDING METHOD FOR THICK PLATES

[75] Inventors: Kazuo Agusa; Kozo Akahide, both of Chiba City, Japan

[73] Assignee: Kawasaki Steel Corporation, Kobe City, Japan

[22] Filed: Feb. 29, 1972

[21] Appl. No.: 230,270

[30] Foreign Application Priority Data
Mar. 15, 1971  Japan.............................. 46/13948

[52] U.S. Cl..................... 219/73, 219/130, 219/137
[51] Int. Cl............................................. B23k 9/18
[58] Field of Search...................... 219/73, 130, 137

[56] References Cited
UNITED STATES PATENTS
2,620,423  12/1952  Komers et al......................... 219/73
3,456,089  7/1969  Shrubsall .............................. 219/73
2,866,887  12/1958  Kumagai........................... 219/73 X Primary Examiner—R. F. Staubly
Attorney—Martin Fleit et al.

[57] ABSTRACT

A multiple-wire submerged-arc welding method for welding thick plates of thicker than 16 mm, by using a joint geometry, which consists of a root face width H of 15 to 25 mm and at least one V-groove with a groove depth $h$ equivalent to 0.07H to 0.48H. The joint is welded from both-sides, one pass per side.

11 Claims, 9 Drawing Figures

Fig. 1  *Prior Art*
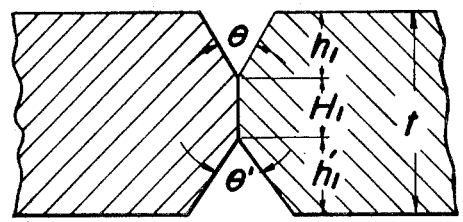
Fig. 2
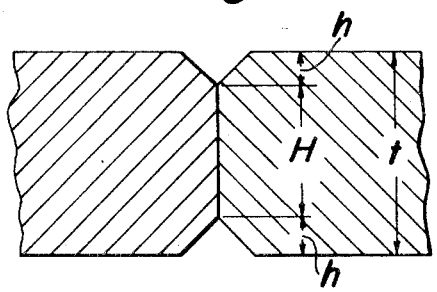

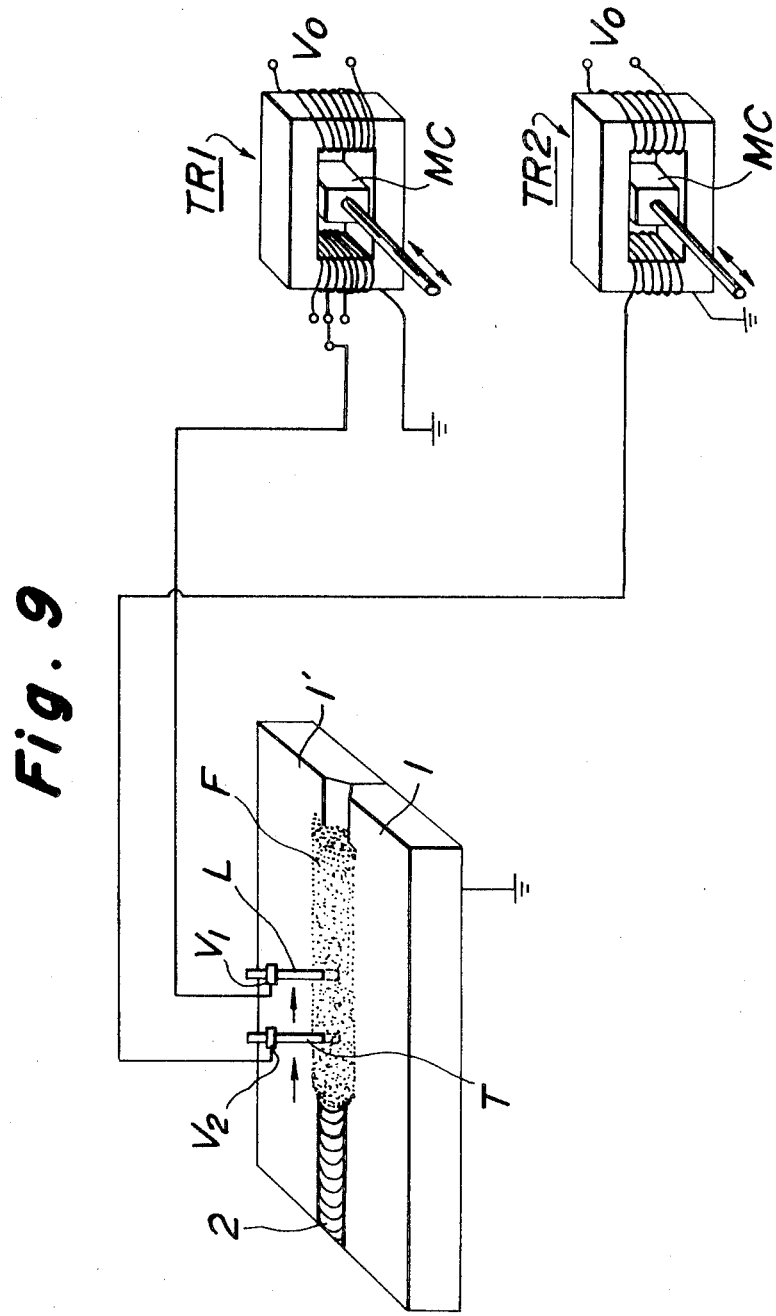

MULTIPLE-WIRE SINGLE-PASS SUBMERGED-ARC WELDING METHOD FOR THICK PLATES

This invention relates to a multiple-wire submerged-arc welding method, and more particularly to a multiple-wire submerged-arc welding method for effecting single-pass welding on two surfaces of thick plates at a high speed by using a high electric current.

In butt welding steel plates, especially comparatively thick plates, a both-side welding method including welding from opposite surfaces of the joint with a single-pass bead on each side thereof has been used. Such conventional both-side welding methods have a shortcoming in that it requires the operation of turning over the plates being welded. Especially, if the welding is carried out in a low-roofed factory building, the welding operation is restricted in various ways, so that the overall efficiency of the welding is comparatively low. To mitigate such difficulty, a one-side welding method is increasingly used, especially for welding elongated articles. The one-side welding method, however, requires additional auxiliary equipment, e.g., a backing means, and laborious time-consuming prearrangement is necessary before actually effecting the one-side welding. Accordingly, the welding of comparatively short articles is still effected by the both-side welding method, and its high weld quality and its efficiency for welding comparatively short articles are well recognized. Although much efforts have been made to improve various welding processes in various aspects, there has not been any significant development in the both-side welding method for thick plates.

In view of the aforesaid problem of conventional welding methods, there has been a need for the development of a new joint geometry which is suitable for submerged-arc welding of thick plates from both-sides of the plates, so as to allow the use of a high electric current for effecting high-speed welding at a high efficiency.

In conventional submerged-arc both-side welding methods, different groove shapes are used, depending on the thickness of plates to be welded; namely, square groove for plates of up to 12 mm thickness, single-V groove with broad root face for plates of 12 to 16 mm thickness, and double-V groove for plates of more than 16 mm thickness. From the standpoint of the ease of the edge preparation and butting operation, the square groove is the best, regardless of the thickness of the plates being welded. On the other hand, from the standpoint of bead appearance, the use of the square groove for thick plates with a thickness in excess of 12 mm tends to cause excessive reinforcement and hot cracks due to improper shape of the bead section.

More particularly, when the plates to be welded are thicker than 12 mm, it is necessary to achieve a sufficiently deep penetration. The bead penetration can be increased by either increasing welding current I or reducing welding speed S. The increase in the welding current I results in an increase of the amount of molten metal from a welding wire, while the reduction in the welding speed S causes an increase in the deposited metal per unit length of the weld bead. With the square groove, the desired bead penetration itself may be obtained by increasing the welding current I or reducing the welding speed S, but such deep penetration is inevitably accompanied with an excessively large reinforcement and a deep but narrow bead penetration. It is well known to those skilled in the art that the deep but narrow bead penetration tends to increase the risk of hot cracks. Due to the aforesaid difficulties, the square groove is not suitable for welding thick steel plates, e.g., plates of more than 12 mm thickness.

Thus, the square groove can be used only for welding of comparatively thin plates requiring only shallow penetration, but it cannot be used for plates thicker than 12 mm requiring deep penetration, because the current and the welding speed necessary for producing the required bead penetration deteriorate the bead appearance and the bead quality. Accordingly, Y-groove, or single-V groove with broad root face, and double-V groove has heretofore been utilized for welding plates thicker than 12 mm. With the Y-groove and double-V groove, a higher welding current can be used, in comparison with the welding current for the square groove, and good bead shape with a satisfactory depth can be formed, while preventing the occurrence of the hot cracks.

The conventional welding method with the Y or double-V groove has shortcomings in that the cross sectional area of the V-groove portion of the Y or double-V groove is large, and such large cross sectional area of the V-groove portion requires slow welding speed, so that the overall efficiency of the welding operation is rather poor. If two or more bead passes are used to fill up such large cross sectional area of the V-groove, the build-up operation of the multiple passes tends to further slow down the welding efficiency. Furthermore, the large cross sectional area at the V-groove portion inevitably requires a large amount of molten metal to fill it at the time of welding, so that the conventional Y or double-V groove consumes a large amount of welding wire. Thus, the conventional method with the Y or double-V groove is costly.

Therefore, an object of the present invention is to mitigate the aforesaid difficulties of the conventional submerged-arc welding method using single-V or double-V groove, wherein the root face width H of the joint is 15 to 25 mm while the V-groove depth, taken in the thickness direction of the plate, is 0.07H to 0.48H. With the joint geometry according to the present invention, each V-groove of the joint can be welded in one pass of bead, and the efficiency and speed of the welding operation can greatly be improved. Furthermore, the joint geometry of the present invention saves the wire consumption, for instance, to one fourth or less of that of conventional joint geometry.

With the joint geometry of the present invention, the V-groove may be formed on either one side of the plates or both sides thereof.

The invention will now be described in detail by referring to the drawings, in which:

FIG. 1 is a schematic sectional view of a known joint geometry of double-V shape;

FIG. 2 is a schematic sectional view of a joint geometry of double-V shape, according to the present invention;

FIG. 9 is a diagrammatic illustration of an electric circuit for multiple-wire submerged-arc welding.

Like parts are designated by like symbols throughout the drawings.

Figure 3:
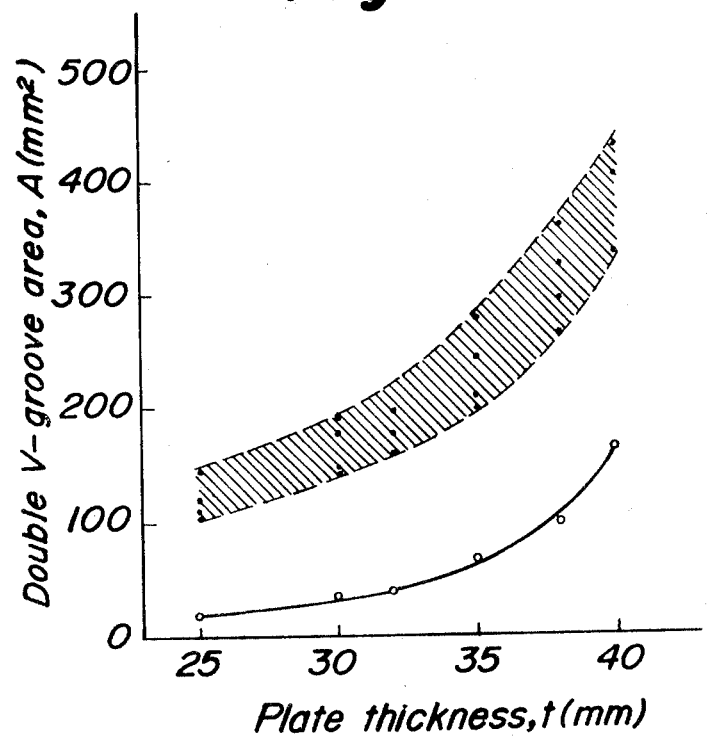
FIG. 3 is a graph, showing the relation between the cross sectional area A of the double-V groove in joint geometry for butt welding two steel plates and the thickness $t$ of such plate.

A conventional joint geometry of double-V shape, as shown in FIG. 1, consists of a small root face width $H_1$ and large V-groove depths $h_1$ and $h_1'$, for instance, in the case of plates with a thickness $t=35$ mm, the root height $H_1$ is 10 mm, and V-groove depths $h_1$ and $h_1'$ are 12 mm and 13 mm, respectively. In the joint geometry of FIG. 1, the typical values of the groove angles $\theta$ and $\theta'$ are 60° and 70°, respectively. In this case, the cross sectional areas of the two V-grooves are 85 mm² and 115 mm², respectively. In order to fill up such wide cross sectional areas of the V-grooves, a high welding current in the order of 1,400 to 1,500 amperes is required. Even if such a high welding current is used, welding speed must be limited to a comparatively low level, for instance, about 30 cm/min at the fastest. The reason for the need of such low welding speed is as follows.

In general, to achieve satisfactory joint, the weld bead in each V-groove should penetrate into the root face by a depth greater than one half of the root face width H. With any conventional welding process using comparatively low current, the maximum bead penetration is about 7 mm at best. Accordingly, the root face width H of conventional joint geometry is restricted to a comparatively small magnitude, so that the cross sectional area of the V-groove has to be large for welding thick plates. Heat input to a large V-groove tends to dissipate along the fusion face of the groove, rather than along the thickness direction of the plates, resulting in a comparatively shallow penetration. Accordingly, in order to obtain a deep penetration, a very large heat input must be provided by slowing down the welding speed.

To deepen the penetration, it may look possible to use a high current at a comparatively high welding speed. In practice, however, the use of too high current tends to cause slag inclusions or other defects and to deteriorate the bead appearance. Thus, there is an upper limit in the magnitude of the welding current, and excessively large current cannot be used for welding purposes. Furthermore, for a given arc voltage, the magnitude of the heat input is proportional to the (current I)/(welding speed S) ratio. For given heat input, high speed S with a high current I produces a deeper penetration than low speed S with a low current I. Thus, conventional butt welding with Y or double-V joint has a shortcoming in that a high welding current cannot be used for welding thick plates. Since high speed welding with a high current is highly desirable from the standpoint of quick service, there is a room for improving the butt welding method.

The aforesaid slow welding with a comparatively low current of conventional Y or double-V joint has another shortcoming in that the large heat input tends to deteriorate the impact properties of the weld bond, because the large heat input makes the grains coarse. For instance, in the case of welding high tensile steel of 60 Kg/mm², the heat input to the steel plates must be less than that for welding mild steel plates, so as to prevent the deterioration of their impact properties due to the aforesaid coarse grain. Thus, the bead penetration cannot be made deep, so that the thickness of the plates to be welded has heretofore been restricted to be less than 25 mm.

The large cross sectional area of the V-groove in conventional joint geometry of Y or double-V shape requires a large amount of welding wire for filling up such area. Accordingly, the conventional welding operation has been costly.

In short, the conventional submerged-arc welding of thick steel plates with Y or double-V joint has the following shortcomings.

1. The welding speed is comparatively low.
2. There is an upper limit in the welding current.
3. The grain size of the heat affected zone is made coarse to deteriorate its impact properties.
4. A large amount of welding wire is required.

The present invention mitigates the aforesaid shortcomings by providing a new multiple-wire submerged-arc welding method by using a joint including single or double V-groove of comparatively small cross sectional area, so as to enable high-speed welding with a high current.

The welding method according to the present invention is featured in that at least two electrodes are used for carrying out the submerged-arc welding. With only one electrode, it is almost impossible to weld thick plates with one-pass bead under high speed condition, because the amount of the molten metal produced by the single electrode is comparatively small and bead appearance obtained by the single electrode is rather poor. If two or more passes of weld beads are used, the welding operation becomes complicated and costly. On the other hand, the multiple-wire welding with two or more electrodes can provide a large amount of molten metal for completing the welding of thick steel plates with only one pass of bead. If two electrodes are used, the leading electrode forms a deep penetrated bead, and the trailing electrode provides additional heat to the bead before it is cooled, for preventing hot cracks and making the bead appearance uniform.

Another feature of the present invention is in the use of high welding current. The high welding current tends to cause slag inclusions or other defects in the case of conventional Y and double-V groove. The inventors have succeeded in mitigating the aforesaid difficulties of the large welding current by devising special joint geometry having a comparatively large root face width H, which joint geometry eliminates the formation of slag inclusions or other defects.

Another feature of the present invention is in the special joint geometry of thick plates to be welded, which joint geometry includes a comparatively large root face width and single or double V-grooves of comparatively small groove depth $h$, as compared with those of conventional joint geometry. FIG. 2 shows a joint geometry, according to the present invention for joining two plates of thickness $t$. In comparing the joint geometry of the invention for plates of thickness $t$, as shown in FIG. 2, with conventional joint geometry for the plates of the same thickness $t$, it is apparent that the root face width H of the invention is larger than the corresponding root face width $H_1$ of the conventional joint, while the groove depth $h$ of the present invention is considerably smaller than the corresponding groove depth $h_1$ or $h_1'$ of the conventional joint. Thus, the cross sectional area of the V-groove in the joint configuration according to the present invention is much smaller than that of conventional joint configuration. For instance, in the case of welding steel plates of 35 mm thickness, the joint configuration of the present invention uses a root face width H of 23 mm and a groove depth h of 6 mm for each of the two V-grooves. In comparison with the aforesaid numerical example of a conventional joint using the groove depth of 12 mm or 13 mm, the cross sectional area A of the V-groove of the present invention is reduced to one fourth or less of that of the conventional joint configuration.

The reduction of the cross sectional area of the V-groove, according to the present invention, allows the use of high-speed welding, while the large root face width H eliminates the risk of the burn-through of the plates being welded. The welding current per electrode is restricted in the present invention too, from the standpoint of the economy of the equipment providing the welding current (for instance, 2,000 Amp at most).

After various studies, the inventors have found out that a joint geometry consisting of a root face width H of 15 to 25 mm and a groove depth h of 0.07H to 0.48H for one or two V-grooves provides the best results. With such joint geometry, if two or more electrodes are used while providing up to 2,000 Amp to a leading electrode (the total current for all the electrodes exceeds 2,000 Amp), excellent weld beads having satisfactory penetration can be achieved by high-speed welding at a very low cost.

Tests were made to check the performance of various joint geometries, each being double-V type including two V-grooves. The results are shown in Table 1.

It is known that the conventional joint geometry of FIG. 1 can be used, for instance, for welding two steel plates, each being 35 mm thick, with a welding current of 1,400 to 1,500 Amp at a welding speed of 30 cm/min. On the other hand, in the tests of Table 1, plates of 35 mm thickness were welded with a total current of 2,200 Amp at a speed of 70 cm/min by using the method of the present invention. Thus, the method of the present invention has succeeded in doubling the welding speed, as far as the above examples are concerned, by using the special joint geometry and a total welding current of about 1.5 times the conventional welding current. The penetration depth of the bead produced by the method of the present invention proved to be satisfactory and the bead appearance was also satisfactory. As pointed out above, the method of present invention also reduces the consumption of the welding wire to almost one fourth of that in the conventional method.

In Sample No. 4 of Table 1, representing a joint geometry according to the present invention, the root face width H for a steel plate of 35 mm thickness is 23 mm. This magnitude of the root face width H is almost twice as high as the corresponding root face width of conventionally used joint geometry for the steel plate of the same thickness. Consequently, the cross sectional area of the V-groove of the present invention is greatly reduced from that of conventional method, so that the heat input to the V-groove of the present invention tends to dissipate along the thickness direction rather than along the fusion face of the groove. Accordingly, the present invention ensures sufficient penetration into the plate with the reduced heat input by using a high welding current and high welding speed.

The use of the large root face width H has the following merits. Firstly, the deep penetration in the large root face width H acts to prevent the formation of coarse grains in the heat affected zone near weld bond. Secondly, with the large root face width H, the presence of small root gaps will not cause the burn-through of the molten metal therethrough, so that the machining of the root face of the joint geometry does not require precision work. Thus, the increased root face width H results in an improved workability of the joint geometry. Thirdly, the inventors have confirmed through tests that, with the root face width of not smaller than 23 mm in the plates of 35 mm thickness, slag inclusion was completely eliminated for any combination of the welding currents $I_1$ and $I_2$ through the leading and trailing electrodes suitable for producing the required penetration.

The aforesaid merits of using a large root face width H cannot be achieved if the root face width H is less than 15 mm or in excess of 25 mm. Accordingly, the root face width H in the joint geometry to be used in the method according to the present invention is restricted to a range of 15 mm to 25 mm.

With the aforesaid relation between the groove depth h and the root face width H in the joint geometry according to the present invention, excellent bead appearance and satisfactory reinforcement can be achieved. More particularly, the small cross sectional area of the V-groove in the joint geometry of the invention makes it necessary to limit the amount of molten metal from the welding wire. Such requirement on the reinforcement is met by suitably controlling the ratio of the welding speed S to the welding current I. In other words, when a large welding current I is used for deepening the penetration, the welding speed has to be increased. Such ratio of the welding speed S to the welding current I is, however, known to those skilled in the art, and it is not an essential part of the present invention. There is a lower limit in the I/S ratio, because a too small I/S ratio means an insufficient heat input for providing the required penetration. The lower limit of the I/S is also known. When the h/H ratio is smaller than 0.07, the I/S ratio suitable for proper reinforcement becomes too small to ensure sufficient penetration at the root face of the joint geometry. On the other hand, if the h/H ratio is greater than 0.48, the cross sec-

TABLE 1

| Joint geometry, Sample No. | Plate thickness, t (mm.) | Groove depth, h (mm.) | Root face width, H (mm.) | h/H ratio | Groove angle α (degree) | Leading electrode | | Trailing electrode | | Welding speed, S (cm./min.) | Remarks |
|---|---|---|---|---|---|---|---|---|---|---|---|
| | | | | | | Current $I_1$ (amp) | Voltage, $V_1$ (volts) | Current $I_2$ (amp) | Voltage, $V_2$ (volts) | | |
| For reference: 1 | 18 | 1 | 16 | 0.06 | 90 | 800 | 30 | 600 | 45 | 70 | Excessive reinforcement. |
| The Invention: | | | | | | | | | | | |
| 2 | 20 | 2 | 16 | 0.13 | 90 | 800 | 30 | 600 | 45 | 70 | |
| 3 | 30 | 4 | 22 | 0.18 | 90 | 1,000 | 30 | 800 | 45 | 70 | |
| 4 | 35 | 6 | 23 | 0.26 | 90 | 1,200 | 30 | 1,000 | 45 | 70 | |
| 5 | 38 | 7 | 24 | 0.29 | 90 | 1,400 | 30 | 1,000 | 45 | 70 | |
| 6 | 40 | 9 | 22 | 0.41 | 90 | 1,600 | 30 | 1,200 | 45 | 70 | |
| For reference: 7 | 48 | 13 | 22 | 0.59 | 90 | 2,000 | 30 | 1,600 | 45 | 70 | Insufficient penetration. | tional area of the V-groove becomes too large to maintain the feature of the present invention. Thus, the $h/H$ ratio in the joint geometry to be used in the present invention is restricted to a range of 0.07 to 0.48.

With the multiple-wire submerged-arc welding method according to the present invention using the special joint geometry including at least one V-groove, steel plates thicker than 16 mm can be welded at a high speed while supplying only small heat input. Such small heat input makes it possible to weld high tensile steel, e.g., 60 Kg/mm² class, which has been considered difficult because conventional welding method tends to make the weld bond brittle. According to tests carried out by the inventors, the preferable range of the root face width $H$ and the $h/H$ ratio for high tensile steel plates of 60 Kg/mm² class are 15 to 23 mm and 0.07 to 0.26, respectively.

In short, conventional single-pass submerged-arc welding with one or two V-grooves has been restricted to plates of up to about 35 mm thickness. The present invention has succeeded in providing a novel submerged-arc welding method which can weld much thicker plates, e.g., plates of up to about 49 mm thickness, at a high speed in a very economical fashion.

The single-pass welding method of thick steel plates according to the present invention greatly simplifies the process of welding thick plates, which have been welded by overlaying a plurality of beads in the V-groove.

Furthermore, the present invention is featured in that the cross sectional area of the V-groove is greatly reduced, e.g., to one fourth of the cross sectional area of a typical conventional V-groove, as shown in FIG. 3. Accordingly, the rate of welding wire consumption is remarkably reduced, so that the cost of welding thick plates is reduced.

Various parameters to be used in the welding method of the present invention, in the case of double-V groove, are selected as follows.

Figure 4:
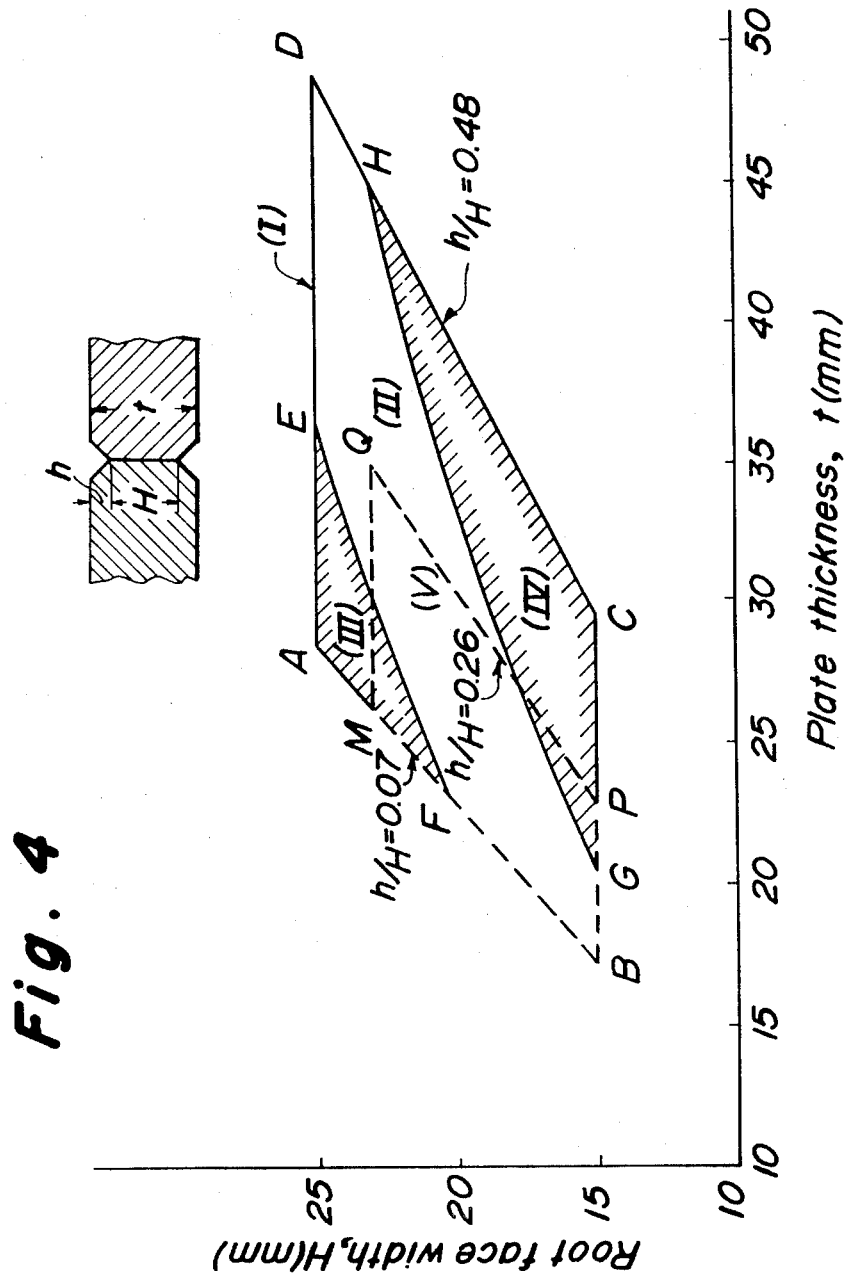
FIGS. 4 to 6 are graphs, illustrating the relation among different dimensional parameters of the joint geometry according to the present invention.

1. Referring to FIG. 4, for a given thickness $t$ of plates to be welded, a suitable root face width $H$ is selected from the range I, or the quadrangle ABCD, depending on the properties of the plates to be welded and the desired properties of the joint, and other related properties.

In FIG. 4, the range II or the non-hatched portion EFBGHD represents the root face width $H$ satisfying the following relations.
$$-4.2 \times 10^{-3}t^2 + 0.6t + 4.6 \leq H \leq -4.2 \times 10^{-3}t^2 + 0.6t + 8.6$$
According to the results of the applicants' tests, if the joint geometry is selected from the range II, the cross sectional area of the V-groove balances best with the amount of the weld metal melted from the welding wire during the welding operation. The upper hatched range III represents comparatively small cross sectional areas of the V-groove, while the lower hatched range IV represents comparatively large cross sectional areas of the V-groove, as compared with the corresponding cross sectional areas for the non-hatched range II. The range V enclosed by the dash-lines in FIG. 4 represents the preferred range for 60 Kg/mm² high tensile steel plates.

2. With the knowledge of the $h/H$ ratio thus selected, a suitable $I_1/\sqrt{S}$, $I_1$ being the current through the leading electrode and $S$ being the welding speed or the velocity of the electrodes relative to the plates being welded, is selected from FIG. 5. According to the results of a number of tests carried out by the inventors, the upper limit and the lower limit of the $I_1/\sqrt{S}$ can be given by the following two equations, respectively.

Upper limit, $I_1/\sqrt{S} = 391h/H + 73.1$
Lower limit, $I_1/\sqrt{S} = 306h/H + 36.4$ If the $I_1/\sqrt{S}$ exceeds the aforesaid upper limit, the reinforcement tends to become too thick. On the other hand, if the $I_1/\sqrt{S}$ ratio is smaller than the aforesaid lower limit, the penetration depth of bead tends to become too shallow. The mean value of the aforesaid upper limit and the lower limit may be used for selecting the typical value of the $I_1/\sqrt{S}$ ratio for the selected $h/H$ ratio, which is determined by referring to FIG. 4.

Figure 5:
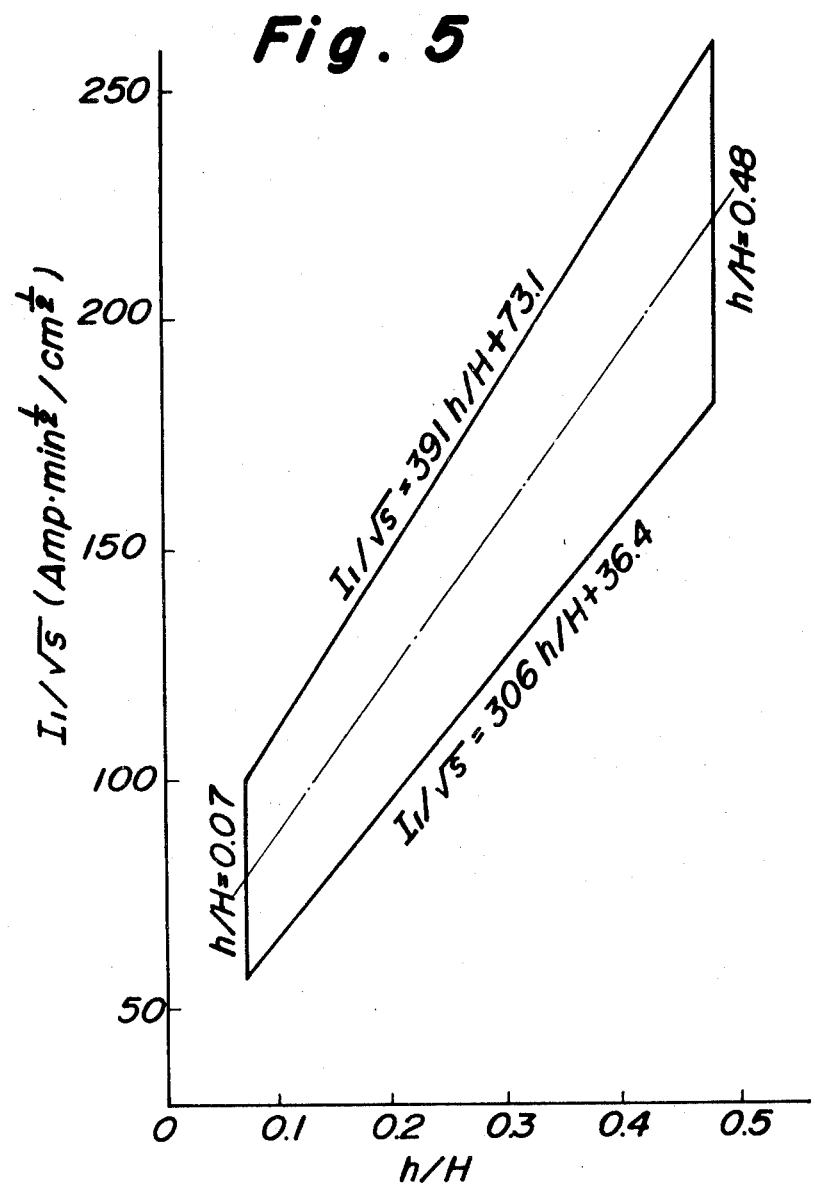

The relation of FIG. 5 is determined based on the data of Table 1. All the grooves in Table 1 use a groove of 90°. Other tests of the inventors show that the relation of FIG. 5 holds for a substantially wide range of the groove angle. The preferable range of the groove angle is 60° to 90°.

The value of the leading electrode current $I_1$ is separately determined, depending on the physical properties and the thickness of the plates being welded. After the leading electrode current $I_1$ is selected, the suitable welding speed $S$ can be determined from the current $I_1$ and the $I_1/\sqrt{S}$ ratio.

Figure 6:
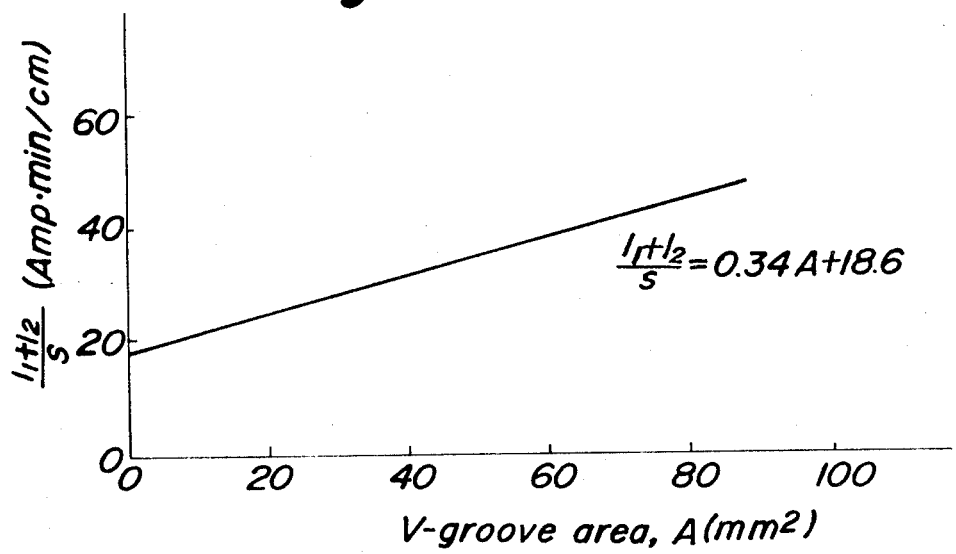

3. FIG. 6 shows the relation between the cross sectional area $A$ of the V-groove to be welded and the $(I_1+I_2)/S$, $I_2$ being the current through the trailing electrode, for producing satisfactory beads, which relation can be expressed by the following equation.

$$(I_1 + I_2)/S = 0.34A + 18.6$$

Consequently, the suitable value of the trailing electrode current can be determined by using the previously determined values of the leading electrode current $I_1$, the welding speed $S$ and the cross sectional area $A$ of the V-groove to be welded.

The invention will now be described in further detail, by referring to Examples.

EXAMPLE 1

Figure 7:
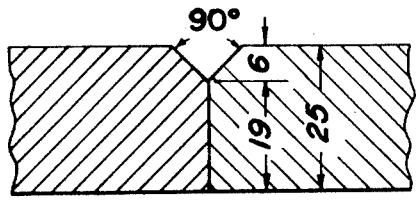
FIGS. 7 and 8 are schematic sectional views, illustrating dimensional examples of single-V and double-V groove according to the present invention, respectively.

A joint with single V-groove, as shown in FIG. 7, was prepared by using two mild steel plates, SS 41, according to Japanese Industrial Standard JIS G 3101, each being 25 mm thick. The root face width $H$ and the groove depth $h$ were 19 mm and 6 mm, respectively. The two plates were joined by submerged-arc single-pass welding by using an A.C. two-electrode welding circuit of FIG. 9, in which low-manganese wire electrodes were used together with bonded flux mainly consisting of alumina, magnesia, lime stone, and silica. The welding conditions were as follows.

| | |
|---|---|
| Leading electrode diameter: | 3.2 mm |
| Leading electrode voltage: | 30 volts |
| Leading electrode current: | 1,200 amperes |
| Trailing electrode diameter: | 4.8 mm |
| Trailing electrode voltage: | 45 volts |
| Trailing electrode current: | 1,000 amperes |
| Spacing between the two electrodes: | 50 mm |
| Welding speed: finishing side (square groove side) | 90 cm/min |
| backing side (V-groove side) | 70 cm/min |

The electric circuit used for the tests is schematically shown in FIG. 9. The primary windings of two welding transformers TR1 and TR2 are connected to a power source voltage $V_0$, respectively. The secondary winding of the welding transformer TR1 is connected to a leading electrode L, so as to establish a leading electrode arc voltage $V_1$. In this Example, the A.C. power source is directly connected to the leading electrode L for welding, but it is also possible to insert a rectifier between the transformer TR1 and the electrode L. The secondary winding of the other welding transformer TR2 is connected to the trailing electrode T for establishing its arc voltage $V_2$. Each of the welding transformers TR1 and TR2 has a movable core MC, which can be actuated by a suitable means (not shown), e.g., as shown by the arrows of the figure, for modifying the leakage reactance of the transformer. In response to such modification of the leakage reactance, the welding current through the electrode L or T is changed.

In FIG. 9, two steel plates 1 and 1' are abutted, by directly bringing the square edges of the two plates in contact with each other. A suitable flux material F is placed on the square groove, and a tandem electrode assembly, consisting of the leading electrode L and the trailing electrode T, moves through the flux, e.g., in the direction as shown by the arrows of the figure. By feeding suitable welding currents through the tandem electrode assembly, a weld bead 2 is formed along the square groove of the two plates 1 and 1'.

Satisfactory penetration was achieved, with a lap of 4 mm of penetration from the opposite surfaces of the plate. The bead reinforcement was of 20 to 23 mm width and 2.5 to 3.0 mm height.

The inspection of the bead configuration proved that it was free from undercuts, overlaps, and other defects. According to the results of X-ray tests of the welded joint, it was free from any weld defects; namely, it was free from insufficient penetration, crackings, slag inclusions, and blowholes.

Various tests were made on the welded joint thus obtained, and excellent mechanical properties of the welded joint was proved; namely, its tensile strength was 47 Kg/mm², and Charpy's impact value of weld metal at 0°C was 8.2 Kg-m. It was proved by a guide bend test that the welded joint had a high ductility and was free from any cracks or other defects when it was bent at 180°.

EXAMPLE 2

Figure 8:
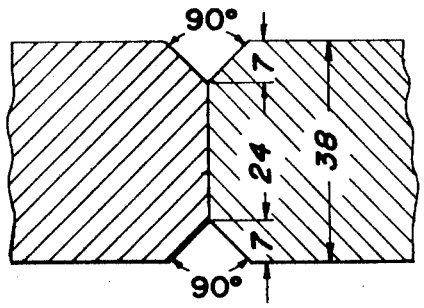

A joint with double V-groove, as shown in FIG. 8, was prepared by using two steel plates of 60 Kg/mm² high tensile strength class, L6D, according to Lloyd's Register of Shipping, each being 38 mm thick. The root face width H and the groove depth h were 24 mm and 7 mm, respectively. The two plates were joined by submerged-arc single-pass welding by using an A.C. two-electrode welding circuit of FIG. 9, in which low-manganese wire electrodes were used together with bonded flux similar to Example 1 but containing small amounts of alloying elements. The welding conditions were as follows.

| | |
|---|---|
| Leading electrode diameter: | 4.0 mm |
| Leading electrode voltage: | 30 volts |
| Leading electrode current: | 1,400 amperes |
| Trailing electrode diameter: | 4.8 mm |
| Trailing electrode voltage: | 45 volts |
| Trailing electrode current: | 1,000 amperes |
| Spacing between the two electrodes: | 60 mm |
| Welding speed: | 70 cm/min |

As a result, satisfactory bead configuration was achieved, with a lap of about 4 mm at the inner ends of penetrations from the opposite surfaces of the plate and a reinforcement of 25 to 27 mm width and 3.0 to 3.3 mm height. The penetration was about 21 mm deep from either end of the root surface.

Various tests were made on the welded joint thus obtained, and excellent mechanical properties of the welded joint was proved; namely, tensile strength was 68 Kg/mm², and Charpy's impact values of weld metal at 0°C was 9.6 Kg-m near the surface of the bead and 7.2 Kg-m at the central portion. It was proved by a side bend test that the welded joint had a high ductility and free from any cracks or other defects when it was bent by 180°. According to the results of visual inspection and X-ray tests of the welded joint, it was free from any weld defects; namely, it was free from insufficient penetration, crackings, slag inclusions, and blowholes. Thus, sound welded joint was obtained for comparatively thick steel plates by the method according to the present invention.

What is claimed is:

1. A multiple-wire single-pass submerged-arc welding method for welding steel plates having a thickness of not less than 16 mm, comprising abutting two plates to be welded to form a joint, said joint having at least one V-shaped groove with a groove depth $h$, a groove angle of about 60° to 90°, and a root face width H of about 15 mm to 25 mm, said root face width H being measured in the direction of the thickness of said plates, said $h$ being 0.07H to 0.48H; applying flux in said V-shaped groove on one side of said joint; and welding said two plates by passing electric current of at least 1,400 amperes to said joint through at least two electrodes while causing said electrodes to travel relative to said joint at a speed such that the bead formed by the leading electrode is kept molten until being further heated by the trailing electrode.

2. A welding method according to claim 1, wherein said speed is substantially not slower than 70 centimeters per minute.

3. A welding method according to claim 1, wherein more than half of said current is passed through the leading electrode.

4. A welding method according to claim 1, wherein said joint configuration includes double V-groove.

5. A welding method according to claim 1, wherein said plates are mild steel plates.

6. A welding method according to claim 1, wherein said plates are high tensile steel plates having a tensile strength of not smaller than 50 Kg/mm².

7. A welding method according to claim 1, wherein said plates are high tensile steel plates having a tensile strength of 60 Kg/mm² and said root face width H is 15 mm to 23 mm, while said groove depth is 0.07H to 0.26H.

8. A welding method according to claim 7, wherein said root face width H in millimeters satisfies the following conditions relating to the thickness $t$ millimeters of said plate
$$-4.2 \times 10^{-3}t^2 + 0.6t + 4.6 \leq H \leq -4.2 \times 10^{-3}t^2 + 0.6t + 8.6.$$

9. A welding method according to claim 1, wherein said root face width H in millimeters satisfies the following conditions relating to the thickness $t$ millimeters of said plate
$$-4.2 \times 10^{-3}t^2 + 0.6t + 4.6 \leq H \leq -4.2 \times 10^{-3}t^2 + 0.6t + 8.6.$$

10. A welding method according to claim 1, wherein the ratio between the leading current $I_1$ amperes and the square root of the welding speed $S$ cm/min falls in a range between the following limits, upper limit, $I_1/\sqrt{S} = 391h/H + 73.1$
lower limit, $I_1/\sqrt{S} = 306h/H + 36.4$, here, $h$ being the groove depth and $H$ being the root face width.

11. A welding method according to claim 1, wherein cross sectional area A of the V-groove to be welded satisfies the following relation, $(I_1 + I_2)/S = 0.34A + 18.6$ here, $I_1$ being the leading electrode current in amperes, $I_2$ being the trailing electrode current in amperes, and $S$ being the welding speed in cm/min.

* * * * *